(12) United States Patent
Will et al.

(10) Patent No.: US 11,020,813 B2
(45) Date of Patent: Jun. 1, 2021

(54) SYSTEMS, METHODS, AND APPARATUS TO REDUCE CAST IN A WELDING WIRE

(71) Applicant: Illinois Tool Works Inc., Glenview, IL (US)

(72) Inventors: Jonathan A. Will, East Troy, OH (US); Jake Zwayer, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 460 days.

(21) Appl. No.: 15/703,008

(22) Filed: Sep. 13, 2017

(65) Prior Publication Data

US 2019/0076952 A1   Mar. 14, 2019

(51) Int. Cl.
*B23K 9/10* (2006.01)

(52) U.S. Cl.
CPC .................................. *B23K 9/1093* (2013.01)

(58) Field of Classification Search
CPC .... B23K 9/1093; B23K 9/125; B23K 9/0953; B23K 9/0956; B23K 9/235; B23K 9/1043; B23K 9/173
See application file for complete search history.

(56) References Cited

U.S. PATENT DOCUMENTS

| | | |
|---|---|---|
| 2,365,958 A | 12/1944 | Holslag |
| 2,416,047 A | 2/1947 | Dolan |
| 3,030,495 A | 4/1962 | Anderson |
| 3,288,982 A | 11/1966 | Haruyoshi |
| 3,549,857 A | 12/1970 | Carter |
| 3,725,629 A | 4/1973 | Vickers |
| 3,809,853 A | 5/1974 | Manz |
| 3,849,871 A | 11/1974 | Kaunitz |
| 3,912,980 A | 10/1975 | Crump |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,329,561 A | 5/1982 | Schafer |
| 4,426,565 A | 1/1984 | Rueter |
| 4,447,703 A | 5/1984 | Stol |
| 4,467,176 A | 8/1984 | Mizuno |

(Continued)

FOREIGN PATENT DOCUMENTS

| | | |
|---|---|---|
| AT | 413801 | 6/2006 |
| CA | 2072711 | 12/1992 |

(Continued)

OTHER PUBLICATIONS

Int'l Search Report and Written Opinion for PCT/US2016/065265 dated Mar. 14, 2017 (16 pages).

(Continued)

*Primary Examiner* — Brian W Jennison
(74) *Attorney, Agent, or Firm* — McAndrews, Held & Malloy, Ltd.

(57) ABSTRACT

Systems, methods, and apparatus to reduce cast in a welding wire are disclosed. Example systems to reduce cast in a welding wire include a wire advancement roller configured to advance welding wire from a welding wire supply toward a welding torch; and a wire straightener configured to reduce cast in the welding wire by applying heat to the welding wire between the welding wire supply and the welding torch.

14 Claims, 6 Drawing Sheets

(56) References Cited

U.S. PATENT DOCUMENTS

| | | |
|---|---|---|
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,547,654 A | 10/1985 | Stol |
| 4,580,026 A * | 4/1986 | Stol .............. B23K 9/1093 |
| | | 219/136 |
| 4,614,856 A | 9/1986 | Hori |
| 4,628,182 A | 12/1986 | Hori |
| 4,631,385 A | 12/1986 | Rothermel |
| 4,667,083 A | 5/1987 | Stol |
| 4,675,494 A | 6/1987 | Dilay |
| 4,728,761 A | 3/1988 | Mucha |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,001,326 A | 3/1991 | Stava |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,521,355 A * | 5/1996 | Lorentzen ........... B23K 9/1336 |
| | | 219/137.61 |
| 5,526,561 A | 6/1996 | McGaffigan |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn |
| 5,773,799 A | 6/1998 | Maxfield |
| 5,783,799 A | 7/1998 | Geissler |
| 5,832,765 A | 11/1998 | Ohashi |
| 5,844,193 A | 12/1998 | Nomura |
| 5,963,022 A | 10/1999 | Buda |
| 5,968,587 A | 10/1999 | Frankel |
| 5,994,659 A | 11/1999 | Offer |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,077,369 A | 6/2000 | Kusano et al. |
| 6,078,023 A | 6/2000 | Jones |
| 6,090,067 A | 7/2000 | Carter |
| 6,107,602 A | 8/2000 | Geissler |
| 6,115,273 A | 9/2000 | Geissler |
| 6,160,241 A | 12/2000 | Stava |
| 6,169,263 B1 | 1/2001 | Derby |
| 6,204,476 B1 | 3/2001 | Reynolds |
| 6,248,976 B1 | 6/2001 | Blankenship |
| 6,259,059 B1 | 7/2001 | Hsu |
| 6,265,688 B1 | 7/2001 | Lyshkow |
| 6,274,845 B1 | 8/2001 | Stava |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear |
| 6,515,259 B1 | 2/2003 | Hsu |
| 6,559,416 B1 | 5/2003 | Steenis |
| 6,583,386 B1 | 6/2003 | Ivkovich |
| 6,596,970 B2 | 7/2003 | Blankenship |
| 6,624,388 B1 | 9/2003 | Blankenship |
| 6,642,482 B2 | 11/2003 | Rappl |
| 6,670,579 B2 | 12/2003 | Davidson |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,984,806 B2 | 1/2006 | Huismann |
| 6,995,338 B2 | 2/2006 | Hutchison |
| 7,002,103 B2 | 2/2006 | Holverson |
| 7,105,775 B2 | 9/2006 | Giese |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,381,923 B2 | 6/2008 | Gordon |
| 7,576,300 B2 | 8/2009 | Giese |
| 7,626,139 B2 | 12/2009 | Matsuguchi |
| 7,683,290 B2 | 3/2010 | Daniel |
| 8,203,100 B2 | 6/2012 | Ueda |
| 8,288,686 B2 | 10/2012 | Kaufman |
| 8,304,693 B2 | 11/2012 | Ma |
| 8,357,877 B2 | 1/2013 | Ma |
| 8,487,215 B2 | 7/2013 | Holverson |
| 8,604,388 B2 | 12/2013 | Dingeldein |
| 9,095,928 B2 | 8/2015 | Ash |
| 9,193,004 B2 | 11/2015 | Enyedy |
| 9,193,005 B2 | 11/2015 | Ma |
| 9,233,432 B2 | 1/2016 | Zhang |
| 9,403,231 B2 | 8/2016 | Hutchison |
| 9,409,250 B2 | 8/2016 | Daniel |
| 9,463,523 B2 | 10/2016 | Roth |
| 9,539,662 B2 | 1/2017 | Hutchison |
| 9,669,486 B2 | 6/2017 | Dingeldein |
| 9,862,050 B2 | 1/2018 | Cole |
| 9,950,383 B2 | 4/2018 | Davidson |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 * | 8/2002 | Arndt .................. B23K 9/0953 |
| | | 219/125.1 |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0072762 A1 | 4/2005 | Delgado |
| 2005/0184039 A1 | 8/2005 | Stava |
| 2005/0269306 A1 | 12/2005 | Fulmer |
| 2006/0163227 A1 | 7/2006 | Hillen |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0053978 A1 | 3/2008 | Peters |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0173726 A1 | 7/2009 | Davidson |

(56) References Cited

U.S. PATENT DOCUMENTS

| | | |
|---|---|---|
| 2009/0215302 A1 | 8/2009 | Roberts |
| 2010/0012637 A1 | 1/2010 | Jaegar |
| 2010/0059493 A1 | 3/2010 | McAninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0204035 A1 | 8/2011 | Grossauer |
| 2011/0297658 A1 | 8/2011 | Peters |
| 2011/0248007 A1 | 10/2011 | Takeda |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0264323 A1 | 10/2013 | Daniel |
| 2013/0270245 A1 | 10/2013 | Holverson |
| 2014/0008328 A1 | 1/2014 | Enyedy |
| 2014/0008331 A1 | 1/2014 | Ogborn |
| 2014/0008339 A1* | 1/2014 | Ogborn .................. B23K 26/38 219/121.72 |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1* | 1/2014 | Peters .................. B23K 9/1043 219/130.51 |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0158669 A1 | 6/2014 | Davidson |
| 2014/0183176 A1 | 7/2014 | Hutchison |
| 2014/0217077 A1 | 8/2014 | Davidson |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0263251 A1 | 9/2014 | Enyedy |
| 2014/0319103 A1 | 10/2014 | Stabb et al. |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1* | 7/2015 | Denney .................. B23K 9/173 219/76.14 |
| 2015/0251275 A1 | 9/2015 | Denney |
| 2015/0273612 A1 | 10/2015 | Peters |
| 2015/0283638 A1 | 10/2015 | Henry |
| 2015/0283639 A1 | 10/2015 | Henry |
| 2016/0074954 A1 | 3/2016 | Marschke |
| 2016/0144444 A1 | 5/2016 | Davidson |
| 2016/0167151 A1 | 6/2016 | Mehn |
| 2016/0175975 A1* | 6/2016 | Lattner .................. B23K 9/124 219/137.71 |
| 2016/0199939 A1 | 7/2016 | Hartman |
| 2016/0288235 A1 | 10/2016 | Davidson |
| 2016/0318112 A1 | 11/2016 | Hutchison |
| 2017/0080512 A1 | 3/2017 | Centner |
| 2017/0165778 A1 | 6/2017 | Hsu |
| 2017/0225255 A1 | 8/2017 | Zwayer |
| 2018/0236585 A1 | 8/2018 | Davidson |
| 2018/0354057 A1 | 12/2018 | Sigl |

FOREIGN PATENT DOCUMENTS

| | | |
|---|---|---|
| CA | 2883947 | 3/2014 |
| CN | 2125475 | 12/1992 |
| CN | 2181354 | 11/1994 |
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 201249331 | 6/2009 |
| CN | 101804495 | 8/2010 |
| CN | 101862886 | 10/2010 |
| CN | 102059476 | 5/2011 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| CN | 104968465 | 10/2015 |
| DE | 2501928 | 7/1976 |
| DE | 19808383 | 9/1999 |
| DE | 212004000048 | 6/2006 |
| EP | 0150543 | 8/1985 |
| EP | 0194045 | 9/1986 |
| EP | 0204559 | 12/1986 |
| EP | 0387223 | 9/1990 |
| EP | 0936019 A2 | 8/1999 |
| EP | 0936019 A3 | 3/2001 |
| EP | 1232825 | 8/2002 |
| EP | 2218537 | 8/2010 |
| EP | 2286949 | 2/2011 |
| EP | 2322315 | 5/2011 |
| EP | 2522453 | 11/2012 |
| EP | 2892680 | 7/2015 |
| EP | 2781291 | 10/2015 |
| FR | 1443701 | 6/1966 |
| JP | S5719166 | 2/1982 |
| JP | S57109573 | 7/1982 |
| JP | S583784 | 1/1983 |

(56) References Cited

FOREIGN PATENT DOCUMENTS

| | | |
|---|---|---|
| JP | S58119466 | 7/1983 |
| JP | S60108175 | 6/1985 |
| JP | S60108176 | 6/1985 |
| JP | S629773 | 1/1987 |
| JP | S6471575 | 3/1989 |
| JP | H03285768 | 12/1991 |
| JP | H06277840 | 10/1994 |
| JP | H07204848 | 8/1995 |
| JP | H1097327 | 4/1998 |
| JP | H11156542 | 6/1999 |
| JP | 2001276971 | 10/2001 |
| JP | 2003205385 | 7/2003 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 1020060133016 | 12/2006 |
| KR | 20080009816 | 1/2008 |
| KR | 20100120562 | 11/2010 |
| KR | 1020120027764 | 3/2012 |
| KR | 101497460 | 3/2015 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | 2014140783 | 9/2014 |
| WO | 2015125008 | 8/2015 |

OTHER PUBLICATIONS

International Search Report from PCT application No. PCT/US2013/073863 dated May 2, 2014, 15 pgs.
International Search Report from PCT application No. PCT/US2014/014241 dated May 9, 2014, 8 pgs.
International Search Report from PCT Application No. PCT/US2014/055529, dated Mar. 6, 2015, 9 pgs.
International Search Report from PCT application No. PCT/US2014/017864, dated Aug. 22, 2014, 9 pgs.
International Search Report from PCT application No. PCT/US2014/041201, dated Nov. 4, 2014, 11 pg.
International Search Report from PCT application No. PCT/US2015/045715, dated Jan. 7, 2016, 12 pgs.
PCT International Search Report & Written Opinion of PCT/US2012/063783 dated Mar. 1, 2013, 12 pages.
International Search Report from PCT application No. PCT/US2016/017385, dated Jul. 19, 2016, 13 pgs.
Bondy et al., "Graph Theory with Applications," Department of Combinatorics and Optimization, University of Waterloo, 1976, p. 7-8.
"ALT 304," Miller—The Power of Blue, Jun. 2001.
"Maxstar 200 SD, DX, and LX," Miller Electric Mfg. Co., Oct. 2003.
International Search Report from PCT application No. PCT/US2015/056121, dated Apr. 4, 2016, 11 pgs.
International Search Report from PCT application No. PCT/US2015/055040, dated Feb. 3, 2016, 11 pgs.
International Search Report from PCT application No. PCT/US2013/073490 dated May 13, 2014, 10 pgs.
International Search Report from PCT application No. PCT/US2014/045872, dated Nov. 4, 2014, 10 pgs.
International Search Report from PCT application No. PCT/US2013/077710 dated May 9, 2014, 12 pgs.
Int'l Search Report and Written Opinion for PCT/US2018/036852 dated Oct. 2, 2018 (17 pgs.).
Int'l Search Report and Written Opinion for PCT/US2018/036898 dated Oct. 1, 2018 (14 pgs.).
Int'l Search Report and Written Opinion for PCT/US2018/036900 dated Oct. 5, 2018 (15 pgs.).
Int'l Search Report and Written Opinion for PCT/US2018/049888 dated Feb. 1, 2019 (14 pgs.).
Canadian Office Action Appln No. 3,005,408 dated Mar. 19, 2019.
Gupta, "A low temperature hydrogen sensor based on palladium nanoparticles," Published in 2014.
Int'l Search Report and Written Opinion for PCT/US2018/052384 dated Feb. 12, 2019 (12 pgs.).
Lincoln Electric, "Storing and Redrying Electrodes," Published in 2011.
Non-Final Office Action U.S. Appl. No. 15/343,992 dated Mar. 7, 2019 (18 pgs.).
Pitrun, "The effect of welding parameters on levels of diffusible hydrogen in weld metal deposited using gas shield rutile flux cored wires," Published in 2004.
Non-Final Office Action U.S. Appl. No. 15/498,249 dated Sep. 23, 2019 (43 pgs).
Int'l Search Report and Written Opinion Appln No. PCT/US2019/050972, dated Nov. 14, 2019, (13 pgs).
Int'l Search Report and Written Opinion Appln No. PCT/U2019/049109 dated Dec. 2, 2019 (11 pgs).
PCT, IPRP, issued in connection with PCT/US2018/036898, dated Dec. 19, 2019, 7 pages.
PCT, IPRP, issued in connection with PCT/US2018/036900, dated Dec. 19, 2019, 7 pages.
Int'l Search Report and Written Opinion Appln No. PCT/U2019/067491 dated Jun. 25, 2020.

\* cited by examiner

SYSTEMS, METHODS, AND APPARATUS TO REDUCE CAST IN A WELDING WIRE

FIELD

The present disclosure generally relates to systems, methods, and apparatus to preheat welding wire to reduce the amount of hydrogen in solidified welds and to make such welds less susceptible to hydrogen induced cracking (HIC) and hydrogen embrittlement.

BACKGROUND

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

While very effective in many applications, these welding techniques may experience different initial welding performance based upon whether the weld is started with the electrode "cold" or "hot." In general, a cold electrode start may be considered a start in which the electrode tip and adjacent metals are at or relatively near the ambient temperature. Hot electrode starts, by contrast, are typically those in which the electrode tip and adjacent metals are much more elevated, but below the melting point of the electrode wire. In some applications, it is believed that initiation of welding arcs and welds is facilitated when the electrode is hot. However, the current state of the art does not provide regimes designed to ensure that the electrode is heated prior to initiation of a welding operation.

SUMMARY

The present disclosure relates to a wire preheating system, method, and apparatus for use with a welding torch, more particularly, to systems, methods, and apparatus to preheat welding wire for low hydrogen welding.

BRIEF DESCRIPTION OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

The figures are not to scale. Where appropriate, the same or similar reference numerals are used in the figures to refer to similar or identical elements.

DETAILED DESCRIPTION

In the following detailed description, specific details may be set forth in order to provide a thorough understanding of embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify common or similar elements.

The wire drawing and packaging processes used to manufacture wires creates stress in the wire known as wire cast. Conventionally, wire cast can be modified by using mechanical roller systems which induce a stress into the wire that is intended to remove much or the entire wire cast created by packaging and drawing. Some such conventional mechanical systems include a series of opposing rollers through which the wire is fed. The opposing rollers have pressure adjustments that are made to create the desired straightness of the wire upon exit. These conventional systems are mechanical in nature and require additional force to pull and/or push the wire through the system. The tension adjustments are not well understood and, when used, may add to cast to the wire instead of remove it. In cases of severe wire cast, increased levels of force are required on the mechanical rollers to remove the wire cast. The increased force requires higher amounts of pull force since the rollers are mechanically deforming the wire. Wire cast issues are commonly associated with large diameter solid and/or tubular wires, high alloy wires, stainless steel wires, nickel based wires, and/or titanium wires. The most common welding process impacted by wire cast is submerged arc welding (SAW), followed by GMAW.

Accurate wire placement is an important aspect of successful welding. In robotic GMAW, the wire extension from the welding contact tip is often used to as an extension of the torch to help locate the weld joint via touch sensing or seam tracking. In SAW applications in which welding is done in a linear fashion, the precision placement of the wire can impact the placement of the weld, but often cannot be observed due to the flux covering the arc in SAW processes. Repeatable wire placement is difficult when using certain wire compositions and/or diameters, due to the wire cast such wires may or may not possess.

Disclosed examples reduce or eliminate wire cast without the disadvantages of mechanical straightening by heating the wire using resistive heating (also referred to as Joule heating). For example, the resistance of the wire, combined with electrical current flowing through the welding wire, causes power dissipation directly in the wire, which manifests as heat and increases the temperature of the wire. Disclosed examples establish a preheating circuit which includes a portion of the electrode wire, ensuring that preheating current passes through the portion of the electrode wire.

The distance between these two electrical points of contact may vary based on the diameter and or sheath thickness of the wire. In some examples, the electrical current is variable depending on the diameter and/or sheath thickness of the wire. Disclosed example systems activate upon wire feed initiation and deactivate when the wire is fed. Current may be passed to the wire through a contact tip, conductive wire roller, and/or any other stationary or rotary contact surface. Disclosed example systems use one contact to pass current into the wire and use the drive system as a return path for the current to the power source.

The area in which the heating occurs may or may not be shielded with gas as some alloys oxidize more readily when heated.

Disclosed examples include one or more preheating circuits in addition to a welding circuit, which are controlled to provide current to preheat the electrode. Preheating a welding electrode provides a number of potential benefits, which are described in U.S. patent application Ser. No. 15/343,992, filed Nov. 4, 2016, and entitled "Systems, Methods, and Apparatus to Preheat Welding Wire." The entirety of U.S. patent application Ser. No. 15/343,992 is incorporated herein by reference. In addition to provide such benefits, disclosed examples enable more consistent wire placement as the wire extends from a welding torch. Non-mechanical wire straighteners disclosed herein create less drag on the wire, which decreases the force required to feed the wire. Disclosed examples also include a more intuitive system for a user to effectively reduce or eliminate wire cast, because the control system relates to providing electrical current instead of configuring mechanical forces.

Disclosed example systems to reduce cast in a welding wire include a wire advancement roller to advance welding wire from a welding wire supply toward a welding torch, and a wire straightener to reduce cast in the welding wire by applying heat to the welding wire between the welding wire supply and the welding torch.

In some example systems, the wire straightener applies the heat to the welding wire between the welding wire supply and the wire advancement roller. In some examples, the wire straightener includes at least two electrical contacts to electrically contact the welding wire while the welding wire is advanced, and a power supply coupled to the electrical contacts to provide current to the electrical contacts to resistively heat the welding wire. In some examples, the wire advancement roller operates as one of the electrical contacts. Some example systems further include a control circuit to control the power supply to output the current based on a movement speed of the welding wire. In some such examples, the control circuit controls the power supply to output the current based on at least one of a composition of the welding wire or a diameter of the welding wire.

Some example systems further include a welding current input, in which the power supply converts power from the welding current input to provide the current to the electrical contacts. Some example systems further include a wire movement sensor to determine whether the welding wire is moving, and a control circuit to enable the wire straightener when the wire movement sensor determines that the wire is moving, and/or disable the wire straightener when the wire movement sensor determines that the wire is not moving. Some example systems further include a shielding chamber to provide shielding gas adjacent a portion of the welding wire being heated by the wire straightener.

Disclosed example methods include feeding a welding wire from a wire supply toward a welding torch using a wire advancement motor and applying heat to the welding wire to reduce cast in the welding wire without mechanically straightening the welding wire. In some examples, the applying of the heat involves applying the heat to a portion of the welding wire located between the wire supply and the wire advancement motor. In some examples, the applying of the heat to the welding wire involves conducting electric current through the welding wire and an electric power supply and two or more contact points.

Some example methods further involve controlling the electric current based on determining whether the welding wire is moving with respect to the two or more contact points. In some example methods, the controlling of the electric current involves stopping the electric current in response to determining that the welding wire is not moving or is moving at less than a threshold speed. In some examples, the applying of the heat to the welding wire involves controlling the electric current is based on at least one of a wire diameter or a wire composition.

Figure 1:
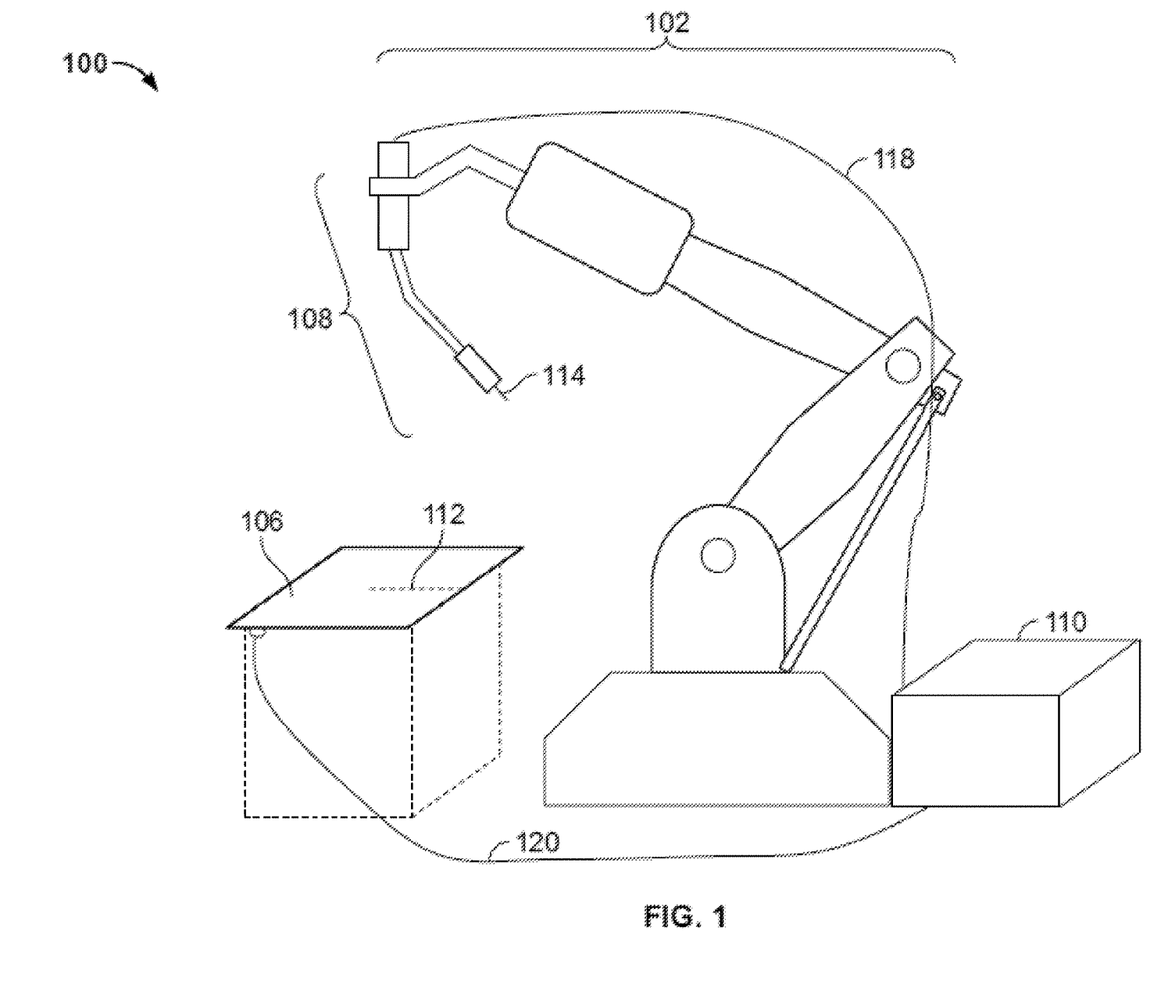
FIG. 1 illustrates an example robotic welding system.

Referring to FIG. 1, an example welding system 100 is shown in which a robot 102 is used to weld a workpiece 106 using a welding torch 108, such as the illustrated bent-neck (i.e., gooseneck design) welding torch (or, when under manual control, a handheld torch), to which power is delivered by welding equipment 110 via conduit 118 and returned by way of a ground conduit 120. The welding equipment 110 may comprise, inter alia, one or more power sources (each generally referred to herein as a "power supply"), a source of a shield gas, a wire feeder, and other devices. Other devices may include, for example, water coolers, fume extraction devices, one or more controllers, sensors, user interfaces, communication devices (wired and/or wireless), etc.

The welding system 100 of FIG. 1 may form a weld (e.g., at weld joint 112) between two components in a weldment by any known electric welding techniques. Known electric welding techniques include, inter alia, shielded metal arc welding (SMAW), MIG, flux-cored arc welding (FCAW), TIG, laser welding, sub-arc welding (SAW), stud welding, friction stir welding, and resistance welding. MIG, TIG, hot wire cladding, hot wire TIG, hot wire brazing, multiple arc applications, and SAW welding techniques, inter alia, may involve automated or semi-automated external metal filler (e.g., via a wire feeder). In multiple arc applications (e.g., open arc or sub-arc), the preheater may pre-heat the wire into a pool with an arc between the wire and the pool. Optionally, in any embodiment, the welding equipment 110 may be arc welding equipment having one or more power supplies, and associated circuitry, that provides a direct current (DC), alternating current (AC), or a combination thereof to an electrode wire 114 of a welding tool (e.g., welding torch 108). The welding torch 108 may be, for example, a TIG torch, a MIG torch, or a flux cored torch (commonly called a MIG "gun"). The electrode wire 114 may be tubular-type electrode, a solid type wire, a flux-core wire, a seamless metal core wire, and/or any other type of electrode wire.

Figure 2:
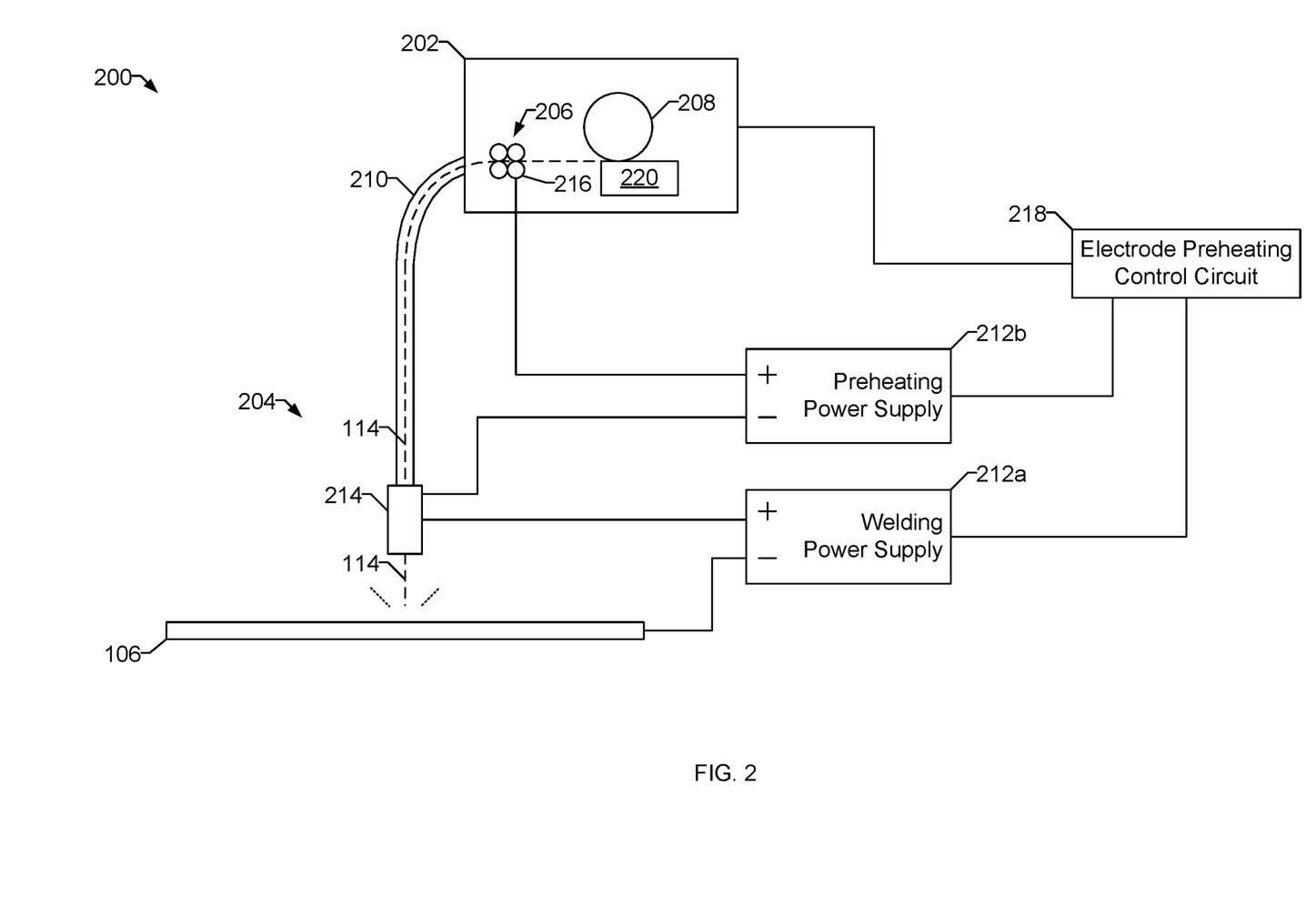
FIG. 2 illustrates another example system including a preheating circuit having contact points at both a wire feeder and a torch assembly, in accordance with aspects of this disclosure.

As will be discussed below, the welding torch 108 may employ a contact tip assembly that heats the electrode wire 114 prior to forming a welding arc using the electrode wire 114. Suitable electrode wire 114 types includes, for example, tubular wire, metal cored wire, aluminum wire, solid gas metal arc welding (GMAW) wire, composite GMAW wire, gas-shielded FCAW wire, SAW wire, self-shielded wire, etc. In one aspect, the electrode wire 114 may employ a combination of tubular wire and reverse polarity current, which increases the metal transfer stability by changing it from globular transfer to a streaming spray. By preheating prior to wire exiting the first tip and fed in the arc (where the material transfer takes place), the tubular electrode wire 114 acts more like a solid wire in that the material transfer is a more uniform spray or streaming spray. Moreover, there is a reduction in out-gassing events and very fine spatter-causing events, which are normally seen while welding with metal core wire. Such a configuration enables the tubular wire to function in a manner similar to a solid wire type streaming spray. Yet another benefit of preheating is alleviating wire flip due to poor wire cast and helix control in wire manufacturing (which may be more pronounced in tubular wire than solid wire) because the undesired wire twist will be reduced in the preheating section. FIG. 2

FIG. 2 illustrates an example system 200 including a preheating circuit having contact points at both a wire feeder 202 and a torch assembly 204.

The example wire feeder 202 includes a wire drive 206 and a wire spool 208 storing the electrode wire 114. The wire drive 206 pulls the electrode wire 114 from the wire spool 208 and feeds the electrode wire 114 to the torch assembly 204 via a cable 210.

A welding power supply 212a supplies welding-type power to the electrode wire 114 via a contact tip 214 for welding the workpiece 106. A preheating power supply 212b supplies preheating current to the electrode wire 114 between the torch assembly 204 and the wire spool 208. The welding power supply 212a and the preheating power supply 212b may ultimately share a common power source (e.g., a common generator or line current connection), but the current from the common power source is converted, inverted, and/or regulated to yield the two separate currents—the preheat current and the welding current. For instance, the preheat operation may be facilitated with a single power source and associated converter circuitry. In which case, three leads may extend from the welding equipment 110 and/or an auxiliary power line in the welder, in which the separate preheating power supply 212b may be omitted.

In the illustrated example, the preheating power supply 212b supplies the current via one or more roller(s) 216 of the wire drive 206 (e.g., a drive roller, an idle roller) and the contact tip 214. Alternatively, instead of providing the preheating current via the wire drive 206, the example wire drive 206 may include a contact tip or other wire contactor through which the preheating power supply 212b provides the preheating current to the electrode wire 114. The preheating power supply 212b may provide a relatively low preheat current due to the time required for the electrode wire 114 to traverse the distance from the wire drive 206 in the wire feeder 202 and the contact tip 214, to avoid melting the electrode wire 114 or causing buckling due to reduction in column strength of the electrode wire 114.

A electrode preheating control circuit 218 controls the preheating of the electrode wire 114 based on, for example, the distance between the roller(s) 216 and the contact tip 214, one or more characteristics of the electrode wire 114, and/or the wire feed speed. In some examples, the electrode preheating control circuit 218 disables preheating when the wire feed speed is less than a threshold speed, to avoid melting the electrode wire 114. For example, the electrode preheating control circuit 218 may control the preheating power supply 212b to stop the preheating electric current when the advancement speed is less than a threshold speed. The wire feeder 202 may include a wire movement sensor 220 that determines or infers whether the electrode wire 114 is moving (e.g., moving at at least a threshold speed). The example wire movement sensor 220 may include a physical sensor or meter (e.g., physically measuring movement of the wire) and/or one or more non-physical and/or data-based determinations (e.g., inferring whether the wire is moving based on other factors in the system 200).

In operation, the example preheating power supply 212b, the roller(s) 216, and the contact tip 214 function as a wire straightener by resistively heating the electrode wire 114 to a temperature that reduces cast in the electrode wire 114, such as by heating to a temperature that causes the electrode wire 114 to release tensile stress, compressive stress, and/or any other stresses stored in the electrode wire 114.

In contrast with conventional wire straighteners, the example system 200 of FIG. 2 removes cast from (e.g., straightens) the electrode wire 114 without mechanical straightening, which compensates for stresses in the electrode wire 114 that manifest as wire cast by mechanically introducing countering stresses.

The preheating current and the welding current may be DC, AC, pulsed DC, and/or a combination thereof. For example, the welding current may be AC, while the preheat current may be DC, or vice versa. Similarly, the welding current may be DC electrode negative (DCEN) or a variety of other power schemes. The current could be line frequency AC delivered from a simple transformer with primary phase control. Controlling the current and voltage delivered to the preheat section may be simpler using a CC, CV, or constant power depending on how the control is implemented as well as the power supply configuration. In certain aspects, the welding current waveform may be further controlled, including constant voltage, constant current, and/or pulsed (e.g., AccuPulse). In certain aspects, constant voltage and/or constant power, constant penetration, and/or constant enthalpy may be used to facilitate preheat instead of constant current.

The welding system 200 may be configured to monitor the exit temperature of the electrode wire 114 (e.g., the preheat temperature), as illustrated, between the between the roller(s) 216 and the contact tip 214. The preheat temperature may be monitored using one or more temperature determining devices, such as a thermometer, positioned adjacent the electrode wire 114, or otherwise operably positioned, to facilitate periodic or real-time feedback. Example thermometers may include both contact sensors and non-contact sensors, such as non-contact infrared temperature sensors, thermistors, and/or thermocouples. An infrared thermometer determines temperature from a portion of the thermal radiation emitted by the electrode wire 114 to yield a measured preheat temperature. The temperature determining device may, in addition to or in lieu of the thermometers, comprise one or more sensors and/or algorithms that calculate the preheat temperature of the electrode wire 114. For example, the system may dynamically calculate temperature based on, for example, a current or voltage. In certain aspects, the thermometer may measure the temperature of the dielectric guide or first contact tip to infer the wire temperature.

In operation, the operator may set a target predetermined preheat temperature whereby the welding system 100 dynamically monitors the preheat temperature of the electrode wire 114 and adjusts the preheat current via the preheating power supply 212b to compensate for any deviation (or other difference) of the measured preheat temperature from the target predetermined preheat temperature. Similarly, controls may be set such that a welding operation cannot be performed until the electrode wire 114 has been preheated to the predetermined preheat temperature.

The electrode preheating control circuit 218 controls the preheat parameters, such as preheat power, current, voltage and/or joule heating, based on observed cast reduction temperature for the type of electrode wire 114, characteristics of the electrode wire 114 (e.g., diameter, wire composition, etc.), and based on the feed speed of the electrode wire 114. For instance, a higher feed rate of the electrode wire 114 may require higher preheat power. Welding with tubular electrodes on butt joints may require less preheat power than tubular electrodes with a joggle joint. Larger diameter tubular wire with more cross-sectional area may require higher preheat power.

The example electrode preheating control circuit 218 may use a look-up table or other memory structure to retrieve preheat parameters based on inputs to the electrode preheating control circuit 218 (e.g., via a user interface or another input method). For example, the electrode preheating control circuit 218 may use a wire feed speed, a wire type (e.g., tubular wire, solid wire, a wire name, etc.), and/or a wire diameter, to identify in the table one or more of a preheating current, a preheating voltage, a preheating enthalpy, a target wire temperature, and/or a wire resistance (e.g., indicative of the temperature of the wire) to be used to control the preheating power supply 212b. The wire type may be identified, for example, using a model number, universal product code (UPC), and/or any a physical description of the wire. In addition to diameter, composition, and wire feed speed, the resistance of the wire may also be included as a variable for determining the preheat. For example, the sheath thickness of a tubular wire and/or a fill percentage (e.g., the ratio of core material weight to sheath weight) at least partially determines the resistance of the wire. The preheating distance may be an input, fixed, and/or dynamically controllable and, therefore, may be used as an input variable for the look-up table. The data in the look-up tables may be determined empirically by testing different wire types to determine the wire temperature and/or duration at which wire cast is reduced to a target amount.

In some examples, the roller(s) 216 and/or the contact tip 214 are modular and/or removable so as to be easily serviceable by a user of the welding system 100. For example, the roller(s) 216 and/or the contact tip 214 may be implemented as replaceable cartridges. In some examples, the electrode preheating control circuit 218 monitors one or more indicators that the roller(s) 216 and/or the contact tip 214 should be replaced, such as measurements of the used time of the roller(s) 216 and/or the contact tip 214, temperature(s) of the roller(s) 216 and/or the contact tip 214, amperage in the roller(s) 216 and/or the contact tip 214 and/or the electrode wire 114, voltage between the roller(s) 216 and/or the contact tip 214 and/or the electrode wire 114, enthalpy in the electrode wire 114, and/or any other data.

Figure 3:
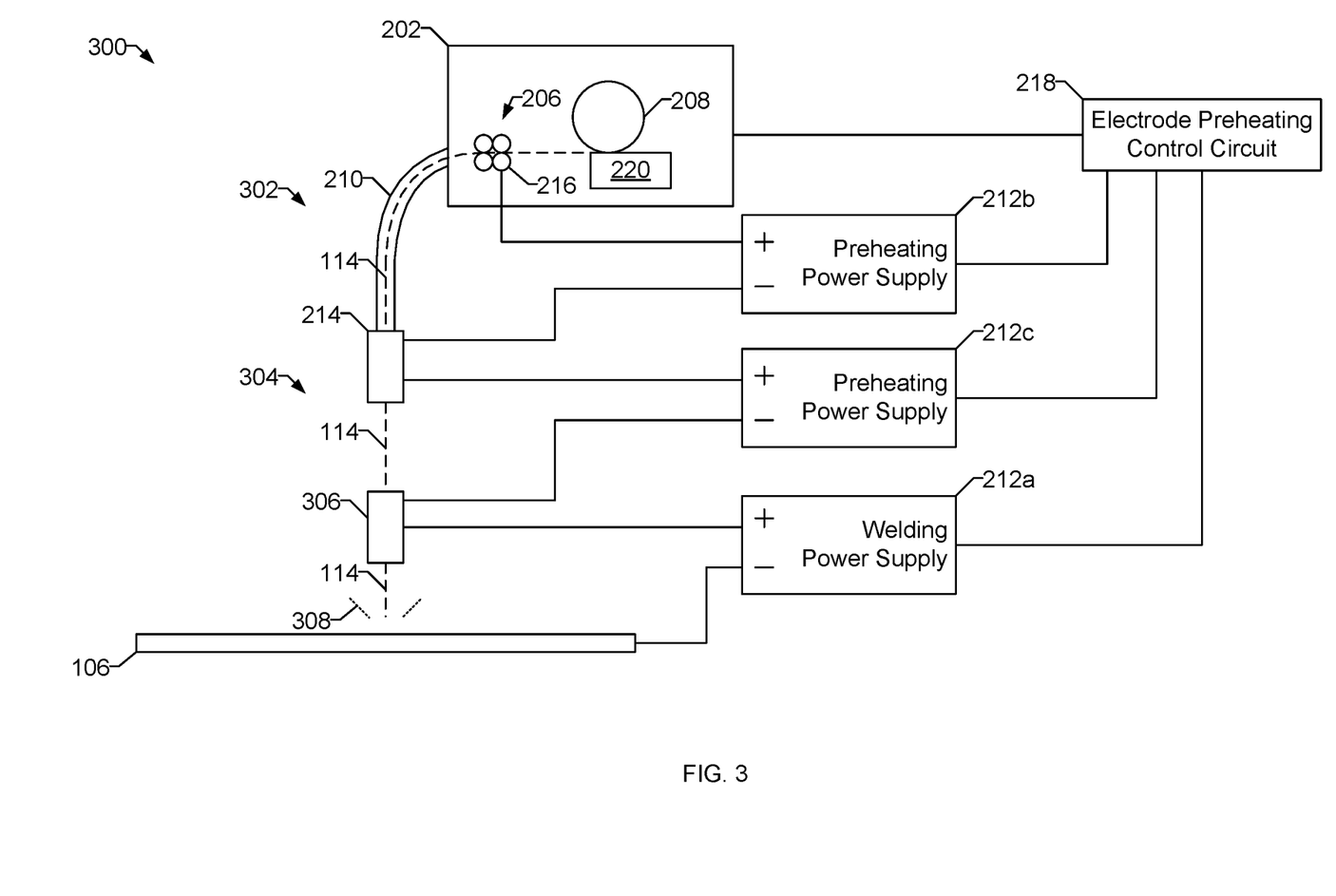
FIG. 3 illustrates another example system including multiple preheating circuits, in accordance with aspects of this disclosure.

FIG. 3 illustrates another example system 300 including multiple preheating circuits. The example system 300 includes the wire feeder 202, the wire drive 206, the wire spool 208, the cable 210, the contact tip 214, the roller(s) 216, and the electrode preheating control circuit 218 of FIG. 2. The example the contact tip 214, the roller(s) 216, and the preheating power supply 212b are part of a first preheating circuit 302.

The system 300 also includes a second preheating power supply 212c to provide preheating current to a second preheating circuit 304, which includes the contact tip 214 and a second contact tip 306.

The example first preheating circuit 302 provides a lower current for a longer distance to reduce wire cast in the electrode wire 114 prior to welding. The example second preheating circuit 304 provides a higher current to increase the temperature of the electrode wire 114 closer to a melting point of the electrode wire 114. In some other examples, the first preheating circuit 302 may provide more energy and temperature increase to the electrode wire 114 to remove wire cast, and the second preheating circuit 304 provides less energy and temperature increase to the electrode wire 114 to increase the temperature of the electrode wire 114 to be close to melting prior to welding.

The example electrode preheating control circuit 218 coordinates the preheating between the first and second preheating circuits 302, 304. For example, as the current in the second preheating circuit 304 increases to increase the temperature further above the wire cast reduction threshold temperature of the wire, the electrode preheating control circuit 218 controls the preheating power supply 212c to reduce the preheating current to avoid melting the electrode wire 114 prior to an arc 308. Alternatively, the first preheating circuit 302 may preheat the electrode wire 114 but not to the wire cast reduction threshold temperature, and the second preheating circuit 304 preheats the electrode wire 114 to the wire cast reduction threshold temperature.

Figure 4:
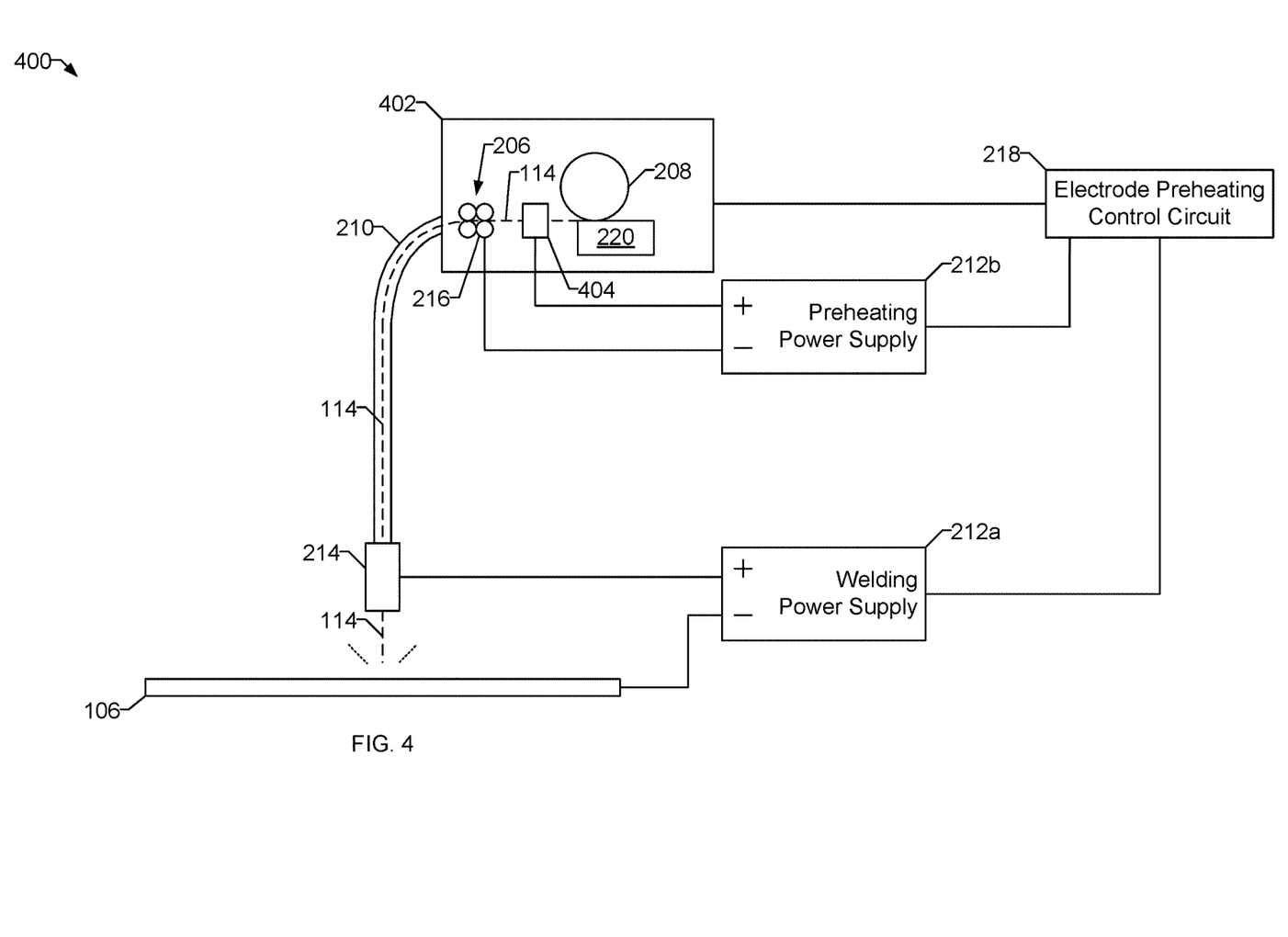
FIG. 4 illustrates another example system including a wire straightener configured to preheat a wire between a wire supply and a wire advancement device, in accordance with aspects of this disclosure.

FIG. 4 illustrates another example system 400 including a wire straightener configured to preheat the electrode wire 114 between a wire supply (e.g., the wire spool 208) and a wire advancement device (e.g., the wire drive 206). The example system 400 includes a wire feeder 402, which includes the wire drive 206 and the wire spool 208 of FIG. 2. The wire feeder 402 further includes a contact tip 404 which, in combination with the wire drive 206 and a preheating power supply 212b, reduces wire cast between the wire spool 208 and a welding torch (e.g., the welding torch 108 of FIG. 1) without mechanical straightening. The example contact tip 404 may be implemented using an idle roller and/or any other wire contactor.

In some examples, the wire feeder 402 includes multiple contact tips and does not use the roller(s) 216 of the wire drive 206 in the preheating circuit.

While the example systems described with reference to FIGS. 2, 3, and 4 include a welding system, disclosed methods and apparatus may be modified to remove wire cast separately of a welding system (e.g., the welding power supply 212a may be omitted from the systems 200, 300, and/or 400 of FIGS. 2, 3, and/or 4).

Any of the example systems of FIGS. 2, 3, and/or 4 may be provided with shielding gas to protect the heated electrode wire against oxidation. For example, a chamber may be positioned around the heated portion of the electrode wire 114 (e.g., around the portion of the electrode wire 114 conducting the current). In some such examples, the volume protected with shielding gas (or other oxygen-reducing techniques) may extend beyond the portion of the electrode wire 114 to reduce oxidation of the wire until the electrode wire 114 is provided with a chance to cool. In other examples, the volume in which the preheating occurs may be filled with shielding gas and/or otherwise effectively cleared of oxygen.

Figure 5:
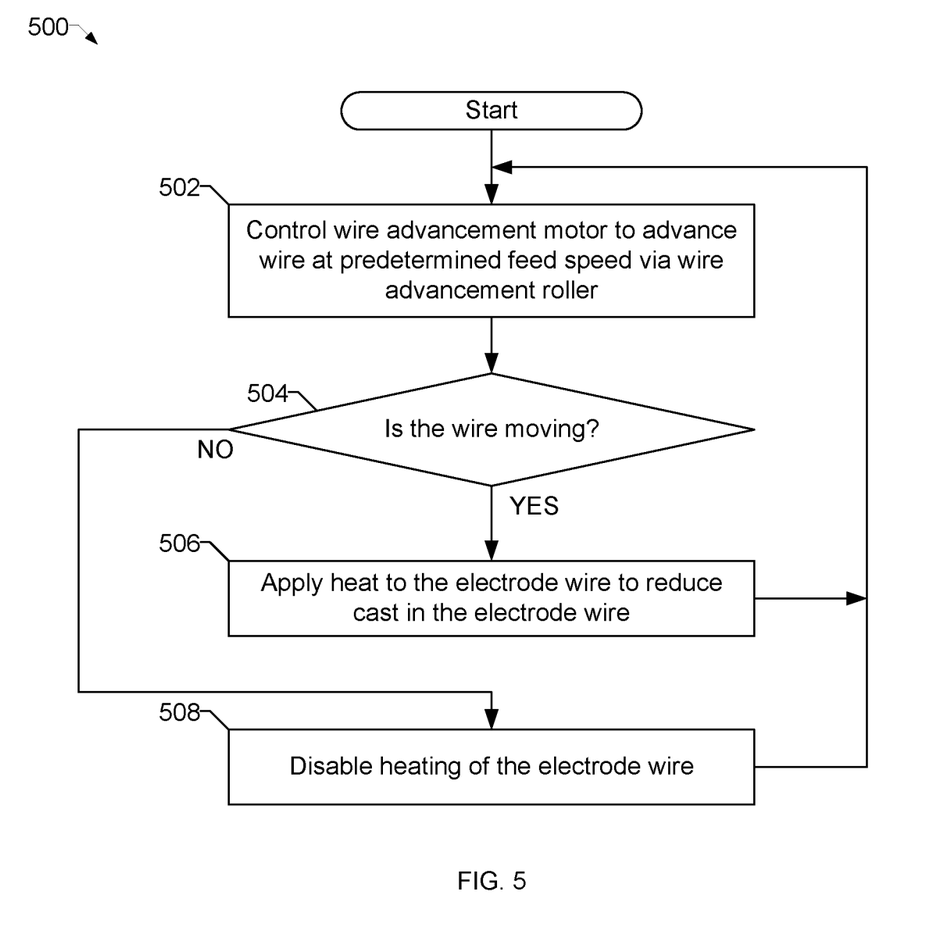
FIG. 5 is a flowchart representative of an example method to reduce cast in welding wire, in accordance with aspects of this disclosure.

FIG. 5 is a flowchart representative of an example method 500 to reduce cast in welding wire. The example method 500 may be implemented by any of the example systems 200, 300, or 400 of FIGS. 2, 3, and/or 4. The example method 500 will be described with reference to the example system 400 of FIG. 4.

At block 502, the example electrode preheating control circuit 218 of FIG. 2 controls a wire advancement motor (e.g., the wire drive 206) to advance wire (e.g., the electrode wire 114) at a predetermined feed speed via a wire advancement roller (e.g., the roller(s) 216). If a wire feeding operation (e.g., welding, hot wire feeding, etc.) is not occurring, the predetermined feed speed may be zero.

At block 504, the electrode preheating control circuit 218 determines (e.g., via the wire movement sensor 220) whether the wire is moving (e.g., whether the wire is being moved with respect to the contact points). If the wire advancement speed of the electrode wire 114 is at least the threshold speed (block 504), at block 506 the example preheating power supply 212b applies heat to the electrode wire 114 (e.g., via the roller(s) 216 and the contact tip 404).

If the wire advancement speed of the electrode wire 114 is less than the threshold speed (block 504), at block 508 the electrode preheating control circuit 218 disables heating of the electrode wire 114 by the preheating power supply 212b.

After applying the heat to the electrode wire 114 (block 506) or disabling the heating of the electrode wire 114 (block 508), control returns to block 502 to continue controlling the wire advancement motor.

Figure 6:
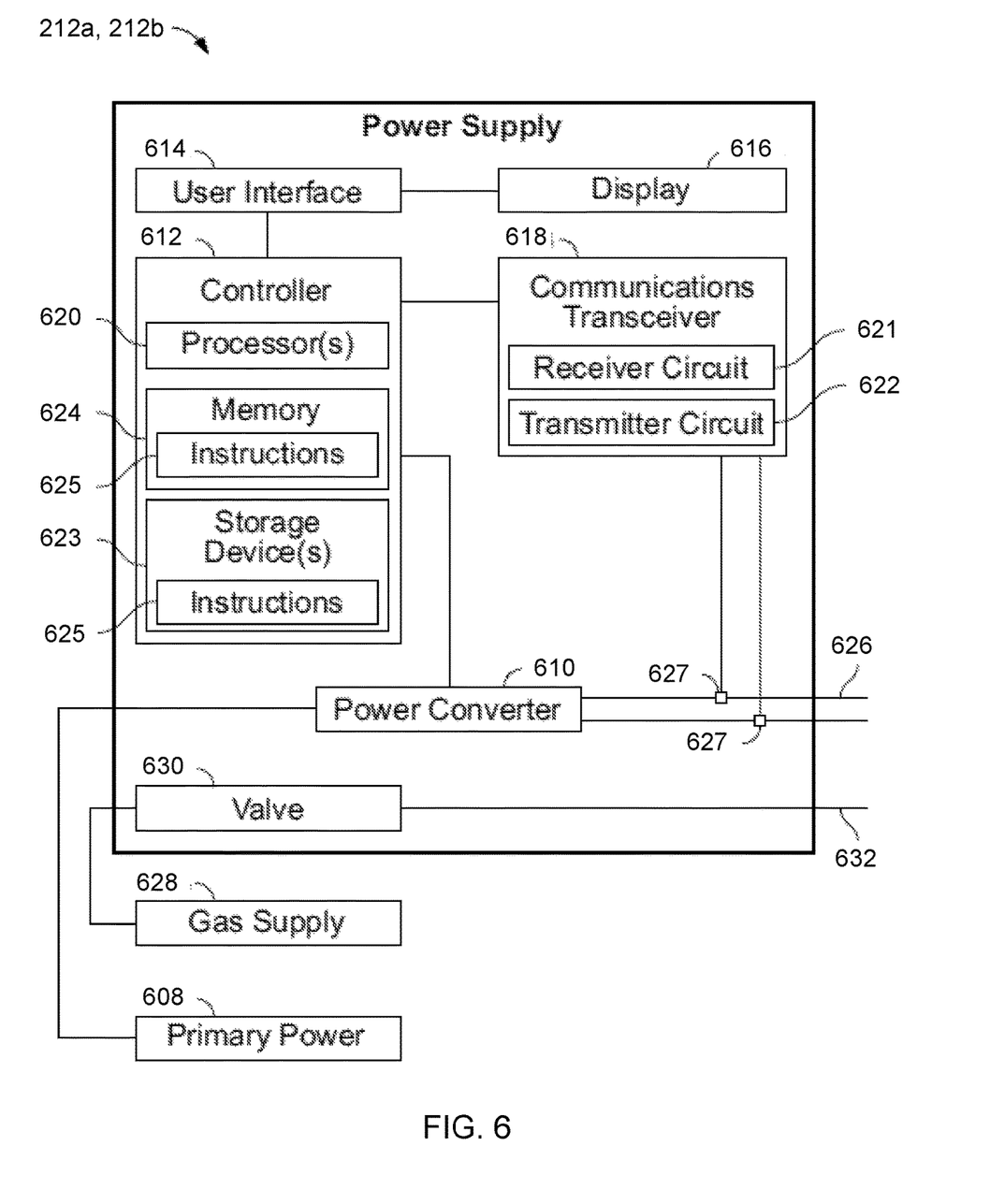
FIG. 6 is a block diagram of an example implementation of the power supplies of FIGS. 2, 3, and/or 4.

FIG. 6 is a block diagram of an example implementation of the power supplies 212a, 212b of FIGS. 2, 3, 4, and/or 5. The example power supply 212a, 212b powers, controls, and supplies consumables to a welding application. In some examples, the power supply 212a, 212b directly supplies input power to the welding torch 108. In the illustrated example, the power supply 212a, 212b is configured to supply power to welding operations and/or preheating operations. The example power supply 212a, 212b also provides power to a wire feeder to supply the electrode wire 114 to the welding torch 108 for various welding applications (e.g., GMAW welding, flux core arc welding (FCAW)).

The power supply 212a, 212b receives primary power 608 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 608 may be supplied from an offsite location (e.g., the primary power may originate from the power grid). The power supply 212a, 212b includes a power converter 610, which may include transformers, rectifiers, switches, and so forth, capable of converting the AC input power to AC and/or DC output power as dictated by the demands of the system (e.g., particular welding processes and regimes). The power converter 610 converts input power (e.g., the primary power 608) to welding-type power based on a weld voltage setpoint and outputs the welding-type power via a weld circuit.

In some examples, the power converter 610 is configured to convert the primary power 608 to both welding-type power and auxiliary power outputs. However, in other examples, the power converter 610 is adapted to convert primary power only to a weld power output, and a separate auxiliary converter is provided to convert primary power to auxiliary power. In some other examples, the power supply 212a, 212b receives a converted auxiliary power output directly from a wall outlet. Any suitable power conversion system or mechanism may be employed by the power supply 212a, 212b to generate and supply both weld and auxiliary power.

The power supply 212a, 212b includes a controller 612 to control the operation of the power supply 212a, 212b. The power supply 212a, 212b also includes a user interface 614. The controller 612 receives input from the user interface 614, through which a user may choose a process and/or input desired parameters (e.g., voltages, currents, particular pulsed or non-pulsed welding regimes, and so forth). The user interface 614 may receive inputs using any input device, such as via a keypad, keyboard, buttons, touch screen, voice activation system, wireless device, etc. Furthermore, the controller 612 controls operating parameters based on input by the user as well as based on other current operating parameters. Specifically, the user interface 614 may include a display 616 for presenting, showing, or indicating, information to an operator. The controller 612 may also include interface circuitry for communicating data to other devices in the system, such as the wire feeder. For example, in some situations, the power supply 212a, 212b wirelessly communicates with other welding devices within the welding system. Further, in some situations, the power supply 212a, 212b communicates with other welding devices using a wired connection, such as by using a network interface controller (NIC) to communicate data via a network (e.g., ETHERNET, 10 BASE2, 10 BASE-T, 100 BASE-TX, etc.). In the example of FIG. 6, the controller 612 communicates with the wire feeder via the weld circuit via a communications transceiver 618.

The controller 612 includes at least one controller or processor 620 that controls the operations of the welding power supply 602. The controller 612 receives and processes multiple inputs associated with the performance and demands of the system. The processor 620 may include one or more microprocessors, such as one or more "general-purpose" microprocessors, one or more special-purpose microprocessors and/or ASICS, and/or any other type of processing device. For example, the processor 620 may include one or more digital signal processors (DSPs).

The example controller 612 includes one or more storage device(s) 623 and one or more memory device(s) 624. The storage device(s) 623 (e.g., nonvolatile storage) may include ROM, flash memory, a hard drive, and/or any other suitable optical, magnetic, and/or solid-state storage medium, and/or a combination thereof. The storage device 623 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 624 may include a volatile memory, such as random access memory (RAM), and/or a nonvolatile memory, such as read-only memory (ROM). The memory device 624 and/or the storage device(s) 623 may store a variety of information and may be used for various purposes. For example, the memory device 624 and/or the storage device(s) 623 may store processor executable instructions 625 (e.g., firmware or software) for the processor 620 to execute. In addition, one or more control regimes for various welding processes, along with associated settings and parameters, may be stored in the storage device 623 and/or memory device 624, along with code configured to provide a specific output (e.g., initiate wire feed, enable gas flow, capture welding data, detect short circuit parameters, determine amount of spatter) during operation.

In some examples, the welding power flows from the power converter 610 through a weld cable 626. The example weld cable 626 is attachable and detachable from weld studs at each of the power supply 212a, 212b (e.g., to enable ease of replacement of the weld cable 626 in case of wear or damage). Furthermore, in some examples, welding data is provided with the weld cable 626 such that welding power and weld data are provided and transmitted together over the weld cable 626. The communications transceiver 618 is communicatively coupled to the weld cable 626 to communicate (e.g., send/receive) data over the weld cable 626. The communications transceiver 618 may be implemented based on various types of power line communications methods and techniques. For example, the communications transceiver 618 may utilize IEEE standard P1901.2 to provide data communications over the weld cable 626. In this manner, the weld cable 626 may be utilized to provide welding power from the power supply 212a, 212b to the wire feeder and the welding torch 108. Additionally or alternatively, the weld cable 626 may be used to transmit and/or receive data communications to/from the wire feeder and the welding torch 108. The communications transceiver 618 is communicatively coupled to the weld cable 626, for example, via cable data couplers 627, to characterize the weld cable 626, as described in more detail below. The cable data coupler 627 may be, for example, a voltage or current sensor.

In some examples, the power supply 212a, 212b includes or is implemented in a wire feeder.

The example communications transceiver 618 includes a receiver circuit 621 and a transmitter circuit 622. Generally, the receiver circuit 621 receives data transmitted by the wire feeder via the weld cable 626 and the transmitter circuit 622 transmits data to the wire feeder via the weld cable 626. As described in more detail below, the communications transceiver 618 enables remote configuration of the power supply 212a, 212b from the location of the wire feeder and/or compensation of weld voltages by the power supply 212a, 212b using weld voltage feedback information transmitted by the wire feeder. In some examples, the receiver circuit 621 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 212a, 212b (e.g., the wire feeder) while the weld current is flowing through the weld circuit.

Example implementations of the communications transceiver 618 are described in U.S. Pat. No. 9,012,807. The entirety of U.S. Pat. No. 9,012,807 is incorporated herein by reference. However, other implementations of the communications transceiver 618 may be used.

In some examples, a gas supply 628 provides shielding gases, such as argon, helium, carbon dioxide, and so forth, depending upon the welding application. The shielding gas flows to a valve 630, which controls the flow of gas, and if desired, may be selected to allow for modulating or regulating the amount of gas supplied to a welding application. The valve 630 may be opened, closed, or otherwise operated by the controller 612 to enable, inhibit, or control gas flow (e.g., shielding gas) through the valve 630. Shielding gas exits the valve 630 and flows through a cable 632 (which in some implementations may be packaged with the welding power output) to the wire feeder which provides the shielding gas to the welding application. In some examples, the power supply 212a, 212b does not include the gas supply 628, the valve 630, and/or the cable 632.

In certain aspects, the torch may be used for resistive preheating applications where there is no arc after the preheated section.

Some of the elements described herein are identified explicitly as being optional, while other elements are not identified in this way. Even if not identified as such, it will be noted that, in some embodiments, some of these other elements are not intended to be interpreted as being necessary, and would be understood by one skilled in the art as being optional.

Although the present disclosure relates to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, or other components of disclosed examples may be combined, divided, re-arranged, or otherwise modified. Therefore, the present disclosure is not limited to the particular implementations disclosed. Instead, the present disclosure will include all implementations falling within the scope of the appended claims, both literally and under the doctrine of equivalents.

What is claimed is:

1. A system to reduce cast in a welding wire, comprising:
a wire advancement roller configured to advance welding wire from a welding wire supply toward a welding torch, wherein the wire advancement roller is located prior to the welding torch along an advancement path of the welding wire; and
a wire straightener configured to reduce cast in the welding wire by applying heat to the welding wire between the welding wire supply and the welding torch, the wire straightener comprising:
the wire advancement roller operating as a first electrical contacts;
a second contact point located at or prior to the welding torch along the advancement path of the welding wire; and
a power supply coupled to the electrical contacts and configured to provide current to the electrical contacts to resistively heat the welding wire.

2. The system as defined in claim 1, wherein the wire straightener is configured to apply the heat to the welding wire between the welding wire supply and the wire advancement roller.

3. The system as defined in claim 1, further comprising an electrode preheating control circuit configured to control the power supply to output the current based on a movement speed of the welding wire.

4. The system as defined in claim 3, wherein the electrode preheating control circuit is configured to control the power supply to output the current based on at least one of a composition of the welding wire or a diameter of the welding wire.

5. The system as defined in claim 1, further comprising a welding current input, the power supply configured to convert power from the welding current input to provide the current to the electrical contacts.

6. A system to reduce cast in a welding wire, comprising:
a wire advancement roller configured to advance welding wire from a welding wire supply toward a welding torch;
a wire straightener configured to reduce cast in the welding wire by applying heat to the welding wire between the welding wire supply and the welding torch via a first contact point located prior to the welding torch along an advancement path of the welding wire and via a second contact point located at or prior to the welding torch along the advancement path of the welding wire;
a wire movement sensor configured to determine whether the welding wire is moving; and an electrode preheating control circuit configured to at least one of:

enable the wire straightener to apply heat to the welding wire when the wire movement sensor determines that the wire is moving; or disable the wire straightener from applying heat to the welding wire when the wire movement sensor determines that the wire is not moving.

7. A system to reduce cast in a welding wire, comprising:

a wire advancement roller configured to advance welding wire from a welding wire supply toward a welding torch;

a wire straightener configured to reduce cast in the welding wire by applying heat to the welding wire between the welding wire supply and the welding torch via a first contact point located prior to the welding torch along an advancement path of the welding wire and via a second contact point located at or prior to the welding torch along the advancement path of the welding wire; and a shielding chamber configured to provide shielding gas adjacent a portion of the welding wire being heated by the wire straightener.

8. The system as defined in claim 1, wherein the wire straightener is configured to apply the heat to the welding wire between the wire advancement roller and the welding torch.

9. The system as defined in claim 6, wherein the wire straightener is configured to apply the heat to the welding wire between the welding wire supply and the wire advancement roller.

10. The system as defined in claim 6, wherein the wire straightener is configured to apply the heat to the welding wire between the wire advancement roller and the welding torch.

11. The system as defined in claim 7, wherein the wire straightener is configured to apply the heat to the welding wire between the welding wire supply and the wire advancement roller.

12. The system as defined in claim 7, wherein the wire straightener is configured to apply the heat to the welding wire between the wire advancement roller and the welding torch.

13. The system as defined in claim 1, wherein the wire advancement roller is in a same housing as the wire supply.

14. The system as defined in claim 1, wherein the wire advancement roller is in a wire feeder configured to push the welding wire toward the welding torch.

* * * * *